(12) United States Patent
Liu

(10) Patent No.: US 8,432,829 B2
(45) Date of Patent: *Apr. 30, 2013

(54) METHOD AND APPARATUS FOR ALLOCATING THE NUMBER OF CODE WORDS AND POWER

(75) Inventor: Qi Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,719

(22) Filed: Oct. 11, 2011

(65) Prior Publication Data

US 2012/0026912 A1 Feb. 2, 2012

Related U.S. Application Data

(63) Continuation of application No. 13/173,618, filed on Jun. 30, 2011, which is a continuation of application No. PCT/CN2009/076160, filed on Dec. 29, 2009.

(30) Foreign Application Priority Data

Dec. 31, 2008 (CN) .......................... 2008 1 0186596

(51) Int. Cl.
*G01R 31/08* (2006.01)
(52) U.S. Cl.
USPC .......................................... 370/252; 370/329
(58) Field of Classification Search .................. 370/329
See application file for complete search history.

(56) References Cited

U.S. PATENT DOCUMENTS

| 2004/0213293 | A1 | 10/2004 | Basso et al. |
| 2005/0208973 | A1 | 9/2005 | Iochi |
| 2006/0019616 | A1* | 1/2006 | Abe et al. .................... 455/113 |
| 2006/0067229 | A1 | 3/2006 | Frederiksen |

(Continued)

FOREIGN PATENT DOCUMENTS

| CN | 1398078 A | 2/2003 |
| CN | 1692579 A | 11/2005 |

(Continued)

OTHER PUBLICATIONS

Written Opinion of the International Searching Authority issued in corresponding PCT Application No. PCT/CN2009/076160, mailed Apr. 8, 2010.

(Continued)

*Primary Examiner* — David Oveissi
(74) *Attorney, Agent, or Firm* — Brinks Hofer Gilson & Lione

(57) ABSTRACT

A method for allocating the number of code words and power according to physical channels carrying data includes: determining initial power and an initial number of code words; adjusting the initial power and the initial number of code words in balanced mode according to resource utilization of data transmission physical channels to select a transport block size (TBS) suitable for data transmission, where the power and the number of code words corresponding to the TBS suitable for data transmission are allocated power and number of code words. An apparatus for allocating the number of code words and power according to physical channels carrying data is also provided. With the present application, it is guaranteed that the number of code words and the power may be allocated in balanced mode.

24 Claims, 4 Drawing Sheets

U.S. PATENT DOCUMENTS

| | | | |
|---|---|---|---|
| 2008/0117843 A1* | 5/2008 | Ishii et al. | 370/310 |
| 2008/0175194 A1 | 7/2008 | Blanz et al. | |
| 2010/0002596 A1 | 1/2010 | Wu | |

FOREIGN PATENT DOCUMENTS

| | | |
|---|---|---|
| CN | 1738476 A | 2/2006 |
| CN | 1777061 A | 5/2006 |
| CN | 1889719 A | 1/2007 |
| CN | 101114851 A | 1/2008 |
| CN | 101127565 A | 2/2008 |
| CN | 101772145 B | 5/2012 |
| EP | 1513272 A1 | 3/2005 |
| WO | 2006/035274 A1 | 4/2006 |
| WO | WO 2006/035274 A1 | 4/2006 |

OTHER PUBLICATIONS

The International Search Report issued in corresponding PCT Application No. PCT/CN2009/076160, mailed Apr. 8, 2010.

$3^{rd}$ Generation Partnership Project, "Technical Specification Group Radio Access Network" Physical Layer Procedures (FDD). Release 9, 3GPP TS25.214, V9.2.0, Mar. 2010.

Written Opinion of the International Searching Authority issued in corresponding PCT Patent Application No. PCT/CN2009/076160, mailed Apr. 8, 2010.

International Search Report issued in corresponding PCT Patent Application No. PCT/CN2009/076160, mailed Apr. 8, 2010.

$3^{rd}$ Generation Partnership Project, "Technical Specification Group Radio Access Network, Physical Layer Procedures (FDD)" Release 9. 3GPP TS 25.214, V.9.2.0, Mar. 2010.

$3^{rd}$ Generation Partnership Project, "Technical Specification Group Radio Access Network, Physical Channels and Mapping of Transport Channels onto Physical Channels (FDD)" Release 5. 3GPP TS 25.211, V5.8.0, Dec. 2005.

$3^{rd}$ Generation Partnership Project, "Technical Specification Group Radio Access Network, Multiplexing and Channel Coding (FDD)" Release 5. 3GPP TS 25.212, V5.10.0, Jun. 2005.

$3^{rd}$ Generation Partnership Project, "Technical Specification Group Radio Access Network, Physical Layer Procedures (FDD)" Release 5. 3GPP TS 25.214, V5.11.0, Jun. 2005.

$3^{rd}$ Generation Partnership Project, "Technical Specification Group Radio Access Network, High Speed Downlink Packet Access (HSDPA), Overall Description" Stage 2 (Release 5). 3GPP TS 25.308, V5.7.0, Dec. 2004.

$3^{rd}$ Generation Partnership Project, "Technical Specification Group Radio Access Network, Medium Access Control (MAC) Procotol Specification" Release 5, 3GPP TS 25.321, V5.12.0, Sep. 2005.

* cited by examiner

METHOD AND APPARATUS FOR ALLOCATING THE NUMBER OF CODE WORDS AND POWER

CROSS-REFERENCE TO RELATED APPLICATIONS

This application is a continuation of U.S. patent application Ser. No. 13/173,618, filed on Jun. 30, 2011, which is a continuation of International Application No. PCT/CN2009/076160, filed on Dec. 29, 2009. The International Application claims priority to Chinese Patent Application No. 200810186596.3, filed on Dec. 31, 2008. The afore-mentioned patent applications are hereby incorporated by reference in their entireties.

FIELD OF THE APPLICATION

The present application relates to wireless communications technologies, and in particular, to a technology for allocating the number of code words and power of physical channels carrying data.

BACKGROUND OF THE APPLICATION

A high speed data packet access (HSDPA) technology is introduced in Release 5 of the 3rd Generation Partnership Project (3GPP). In the HSDPA technology, a packet switching technology is used to transmit data by using a short sub-frame as a transmission time interval (TTI). Each sub-frame lasts 2 ms. A user equipment (UE) may transmit one media access control-high speed packet data unit (MAC-hs PDU) in each TTI. The network may dynamically select a proper air interface transmission ratio and air interface transmission power according to the channel condition of the UE in each TTI. The network transmits data to the UE by using a high speed physical data sharing channel (HS-PDSCH), and uses a high speed sharing control channel (HS-SCCH) as an associated control channel to indicate related control information. The UE reports feedback information to the network by using a high speed dedicated physical control channel (HS-DPCCH). The feedback information of the UE includes a channel quality indicator (CQI) that indicates the current channel condition of the UE and a hybrid automatic request (HARQ) ACK/NACK.

During the specific implementation, the UE reports a CQI value through the HS-DPCCH. Release 5 defines 30 CQI values. Each CQI value indicates a combination of a transport block size (TBS), the number of channels, and a modulation mode. When the UE reports a CQI value, it indicates that, under the current channel condition, the network uses the combination of the TBS, the number of channels, and the modulation mode indicated by the CQI, which may ensure that the UE receives the TBS with a block error rate (BLER) of 10% in an additive white Gaussian noise (AWGN) channel.

When a NodeB transmits data to the UE, the NodeB needs to refer to information such as the CQI, the number of available code words of the cell, available power of the cell, and the data traffic to be transmitted in a buffer to allocate air interface transmission resources to the UE. The number of code words (also represented by the number of physical channels) and the power are two necessary air interface transmission resources.

During the implementation of the present application, the inventor discovers the following problem in the prior art: If only the number of code words or only the power is used up, the allocation of air interface transmission resources fails. Therefore, in the process of allocating the number of code words and power, it is very important to allocate the number of code words and power in balanced mode. Currently, no proper technical solution is available for allocating the number of code words and power in balanced mode.

SUMMARY OF THE APPLICATION

Embodiments of the present application provide a method and an apparatus for allocating the number of code words and power according to physical channels carrying data to allocate the number of code words and power in balanced mode in the process of allocating the number of code words and power.

A method for allocating the number of code words and power according to physical channels carrying data includes:

determining initial power and an initial number of code words; and adjusting the initial power and the initial number of code words in balanced mode according to resource utilization of data transmission physical channels to select a TBS suitable for data transmission, where the power and the number of code words corresponding to the TBS suitable for data transmission are allocated power and number of code words.

An apparatus for allocating the number of code words and power according to physical channels carrying data includes:

an initial-value determining unit, configured to determine initial power and an initial number of code words; and a resource allocating and adjusting unit, configured to adjust the initial power and the initial number of code words in balanced mode according to resource utilization of data transmission physical channels to select a TBS suitable for data transmission, where the power and the number of code words corresponding to the TBS suitable for data transmission are allocated power and number of code words.

In embodiments of the present application, the initial power and the initial number of code words may be adjusted in balanced mode according to the resource utilization of data transmission physical channels so that a TBS suitable for data transmission can be selected. Because the balanced adjustment may avoid using up only the number of code words or only the power, it may be guaranteed that the number of code words and the power can be allocated in balanced mode.

BRIEF DESCRIPTION OF THE DRAWINGS

To make the technical solution of the present application clearer, the accompanying drawings for illustrating the embodiments of the present application are briefly described below. Apparently, the accompanying drawings are exemplary only, and those skilled in the art can derive other drawings from such accompanying drawings without creative efforts.

DETAILED DESCRIPTION OF THE EMBODIMENTS

The technical solution of the present application is hereinafter described in detail with reference to embodiments and accompanying drawings. Apparently, the embodiments described below are exemplary only, without covering all embodiments of the present application. Persons having ordinary skill in the art can derive other embodiments from the embodiments given herein without making any creative effort, and all such embodiments are covered in the scope of the present application.

Figure 1:
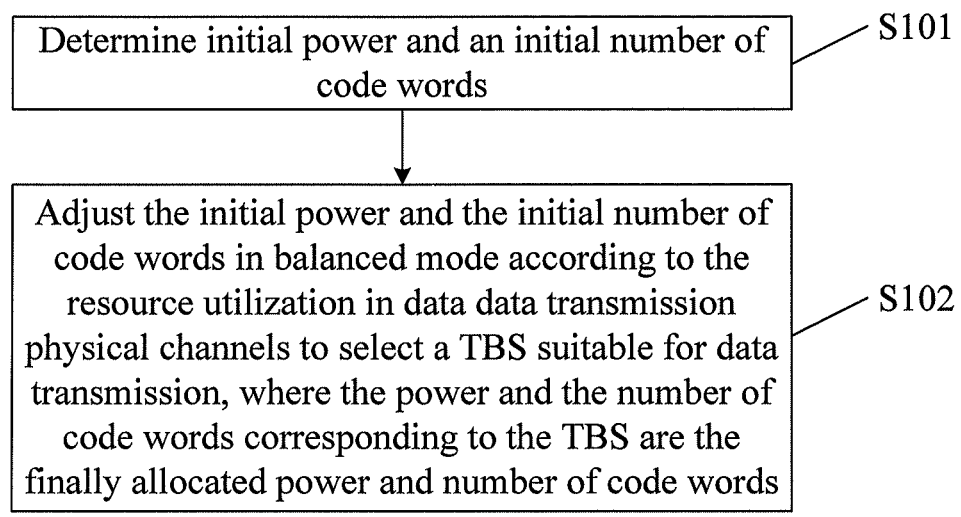
FIG. 1 is a flowchart of a method for allocating the number of code words and power according to physical channels carrying data according to an embodiment of the present application.

The following describes a method for allocating the number of code words and power according to physical channels carrying data according to an embodiment of the present application. As shown in FIG. 1, the method includes the following steps:

Step S101: Determine initial power and an initial number of code words.

Step S102: Adjust the initial power and the initial number of code words in balanced mode according to the resource utilization of data transmission physical channels to select a TBS suitable for data transmission. The power and the number of code words corresponding to the TBS are allocated power and number of code words.

The physical channels carrying data may be HS-PDSCHs, and the power and the number of code words may be the HS-PDSCH power and the number of HS-PDSCH code words.

In the actual implementation, the initial power and initial number of code words may be determined by using multiple methods. For example, a maximum CQI that can be selected currently is obtained according to the currently available maximum power and the CQI that is reported by the UE. The maximum CQI and the currently available maximum number of code words are reduced according to the data traffic to be transmitted in a buffer, and the initial power and the initial number of code words are obtained.

The step of reducing the maximum CQI and the currently available maximum number of code words are reduced according to the data traffic to be transmitted in the buffer and obtaining the initial power and the initial number of code words may also be implemented by using multiple methods. For example, the currently available maximum number of code words remains unchanged, the maximum CQI is reduced; if the obtained TBS is greater than or equal to the data traffic to be transmitted in the buffer, the CQI is reduced continuously until the obtained TBS is smaller than the data traffic to be transmitted in the buffer, and the currently selected CQI is restored to a previously selected CQI. Then, the previously selected CQI remains unchanged, the currently available maximum number of code words is reduced; if the obtained TBS is greater than or equal to the data traffic to be transmitted in the buffer, the number of code words is reduced continuously until the obtained TBS is smaller than the data traffic to be transmitted in the buffer, and the currently selected number of code words is restored to the previously selected number of code words. The power corresponding to the previously selected CQI is the initial power, and the previously selected number of code words is the initial number of code words.

In another example, the maximum CQI remains unchanged, the currently available maximum number of code words is reduced; if the obtained TBS is greater than or equal to the data traffic to be transmitted in the buffer, the number of code words is reduced continuously until the obtained TBS is smaller than the data traffic to be transmitted in the buffer, and the currently selected number of code words is restored to the previously selected number of code words. Then, the previously selected number of code words remains unchanged, the maximum CQI is reduced; if the obtained TBS is greater than or equal to the data traffic to be transmitted in the buffer, the CQI is reduced continuously until the obtained TBS is smaller than the data traffic to be transmitted in the buffer, and the currently selected CQI is restored to the previously selected CQI. The power corresponding to the previously selected CQI is the initial power, and the previously selected number of code words is the initial number of code words.

In the actual implementation, the currently available maximum power may also be used as the initial power, and the currently available maximum number of code words may be used as the initial number of code words. The currently available maximum power may be currently available maximum power of a cell or available maximum power that complies with a preset rule. The currently available maximum number of code words may be the currently available maximum number of code words of a cell or the currently available maximum number of code words that complies with a preset rule or the currently available maximum number of code words that the UE may support.

The resource utilization in the data transmission physical channels may be determined by those skilled in the art according to the actual need in the actual implementation. For example, the resource utilization in the data transmission physical channels may include a ratio of consumed power of the cell and a ratio of consumed code words of the cell. The ratio of consumed power of the cell is a ratio of allocated power of the cell in a current TTI to the originally available maximum power of the cell in the current TTI. The originally available maximum power of the cell includes the allocated power and unallocated power of the cell in the current TTI. If the balanced adjustment is not performed, the allocated power of the cell includes the initial power; if the balanced adjustment is already performed, the allocated power of the cell includes power that is adjusted last time. The ratio of consumed code words of the cell is a ratio of allocated code words of the cell in the current TTI to the originally available maximum number of code words of the cell in the current TTI. The originally available maximum number of code words of the cell includes the number of allocated code words of the cell in the current TTI and the number of unallocated code words in the current TTI. If the balanced adjustment is not performed, the number of allocated code words of the cell includes the initial number of code words; if the balanced adjustment is already performed, the number of allocated code words of the cell includes the number of code words that is adjusted last time.

The step of adjusting the initial power and the initial number of code words in balanced mode according to the resource utilization in the data transmission physical channels of the cell to select a TBS suitable for data transmission may be implemented by using multiple methods. For example, if the ratio of consumed power of the cell is different from the ratio of consumed code words of the cell, a resource with a smaller consumption ratio is increased or a resource with a larger consumption ratio is reduced; the balanced adjustment process does not end until the relationship between the ratio of consumed power of the cell and the ratio of consumed code words of the cell complies with a preset first rule; the power and the number of code words that comply with a preset second rule are selected as the allocated power and number of code words. The first rule may refer to a threshold for the relationship between two ratios. The second rule may be as follows: the power and the number of code words that are obtained last time before the relationship between two ratios reaches the threshold are used as finally allocated power and number of code words; or the power and the number of code words that are obtained when the relationship between two ratios reaches the threshold are used as the finally allocated power and number of code words; or a group of power and number of code words is selected from the preceding two cases as the finally allocated power and number of code words. Certainly, the first rule and the second rule may be designed by those skilled in the art according to the actual need in the actual implementation process, which is not further described.

The resource utilization in the data transmission physical channels of the cell may include a ratio of remaining power of the cell and a ratio of remaining code words of the cell. The ratio of remaining power of the cell is a ratio of unallocated power of the cell in the current TTI to the originally available maximum power of the cell in the current TTI. The originally available maximum power of the cell includes the allocated power and unallocated power of the cell in the current TTI. If the balanced adjustment is not performed, the unallocated power of the cell does not include the initial power; if the balanced adjustment is already performed, the unallocated power of the cell does not include power that is adjusted last time. The ratio of remaining code words of the cell is a ratio of unallocated code words of the cell in the current TTI to the originally available maximum number of code words of the cell in the current TTI. The originally available maximum number of code words of the cell includes the number of allocated code words of the cell in the current TTI and the number of unallocated code words of the cell in the current Tn. If the balanced adjustment is not performed, the number of unallocated code words of the cell does not include the initial number of code words; if the balanced adjustment is already performed, the number of unallocated code words of the cell does not include the number of code words that is adjusted last time.

The step of adjusting the initial power and initial number of code words in balanced mode according to the resource utilization in the data transmission physical channels of the cell to select a TBS suitable for data transmission may include: if the ratio of remaining power of the cell is different from the ratio of remaining code words of the cell, reducing a resource with a smaller remainder ratio or increasing a resource with a larger remainder ratio until the relationship between the ratio of remaining power of the cell and the ratio of remaining code words of the cell complies with a preset third rule; and selecting the power and the number of code words that comply with a preset fourth rule as the finally allocated power and number of code words. The third rule may refer to a threshold for the relationship between two ratios. The fourth rule may be as follows: the power and the number of code words that are obtained last time before the relationship between two ratios reaches the threshold are used as the finally allocated power and number of code words; or the power and the number of code words that are obtained when the relationship between two ratios reaches the threshold are used as the finally allocated power and the number of code words; or a group of power and number of code words is selected from the preceding two cases as the finally allocated power and number of code words. Certainly, the third rule and the fourth rule may be designed by those skilled in the art according to the actual need in the actual implementation process, which is not further described.

The power may be adjusted by adjusting the CQI. The resource utilization in the data transmission physical channels may further include a maximum number of times the CQI is allowed to reduce continuously and a maximum number of times the number of code words is allowed to reduce continuously. The maximum number of times the CQI is allowed to reduce continuously may be adjusted according to the average power utilization, and the maximum number of times the number of code words is allowed to reduce continuously may be adjusted according to the average utilization of the number of code words. The average power utilization refers to the average power utilization of the cell within at least one recent TTI. The average power utilization of the cell within at least one recent TTI refers to the average value of allocated power of the cell within each of the at least one recent TTI. The average utilization of the number of code words refers to the average utilization of the number of code words of the cell within at least one recent TTI. The average utilization of the number of code words of the cell within at least one recent TTI refers to the average value of the number of allocated code words of the cell within each of the at least one recent TTI. That is, the average power utilization refers to the average value of allocated power of the cell within each of the at least one recent TTI. The average utilization of the number of code words refers to the average value of the number of allocated code words of the cell within each of the at least one recent TTI. For example, when the at least one recent TTI is a latest TTI, the average power utilization is the power value allocated within the latest TTI; when the at least one TTI is two latest TTIs, the average power utilization is equal to the sum of power values allocated within each TTI divided by 2. The average utilization of the number of code words may also be calculated in a similar way.

The step of adjusting the initial power and initial number of code words according to the resource utilization in the data transmission physical channels to select a TBS suitable for data transmission may include: if the TBS corresponding to the currently available maximum power and the currently available maximum number of code words is greater than the data traffic to be transmitted in the buffer, reducing a resource corresponding to the larger one of the maximum number of times the CQI is allowed to reduce continuously and the maximum number of times the number of code words is allowed to reduce continuously; if the obtained TBS is still greater than the data traffic to be transmitted in the buffer, reducing the resource continuously until the number of times the resource is reduced reaches the maximum number of times the resource is allowed to reduce continuously; if the obtained TBS is still greater than the data traffic to be transmitted in the buffer, reducing another resource; if the obtained TBS is still greater than the data traffic to be transmitted in the buffer, reducing the another resource continuously until the maximum number of times the another resource is reduced reaches the maximum number of times the another resource is allowed to reduce continuously; if the obtained TBS is still greater than the data traffic to be transmitted in the buffer, reducing the resource reduced at the first time again until a TBS suitable for the data traffic to be transmitted in the buffer is found.

In another embodiment of the present application, the step of adjusting the initial power and the initial number of code words in balanced mode according to the resource utilization in the data transmission physical channels of the cell to select a TBS suitable for data transmission may be implemented by using the following two methods.

Method 1: If the ratio of consumed power of the cell is different from the ratio of consumed code words of the cell, reduce a resource with a larger consumption ratio and maintain a resource with a smaller consumption ratio; if the obtained TBS is greater than the data traffic to be transmitted in the buffer, reduce a resource corresponding to the larger one of a ratio of consumed power of the cell and a ratio of consumed code words of the cell that are obtained by current calculation until a TBS suitable for the data traffic to be transmitted in the buffer is found.

Method 2: If the ratio of remaining power of the cell is different from the ratio of remaining code words of the cell, reduce a resource with a smaller remainder ratio and maintain a resource with a larger remainder ratio, and calculate the ratio of consumed power of the cell and the ratio of consumed code words of the cell according to the currently selected power and code words; if the obtained TBS is greater than the data traffic to be transmitted in the buffer, reduce a resource corresponding to the smaller one of the calculated ratio of remaining power of the cell and the ratio of remaining code words of the cell until a TBS suitable for the data traffic to be transmitted in the buffer is found.

In the balanced adjustment process mentioned in step S102, after the number of code words is adjusted, a CQI-TBS table may be searched for a CQI corresponding to the TBS suitable for data transmission according to the adjusted number of code words. In the CQI-TBS table, TBSs when the number of code words is 1 to 15 under each CQI meet the specified transmission quality requirement. In the balanced adjustment process mentioned in step S102, the power may be adjusted by adjusting the CQI; after the CQI is adjusted, the CQI-TBS table is searched for the number of code words corresponding to the TBS suitable for data transmission under the adjusted CQI, where the TBSs in the CQI-TBS table when the number of code words is 1 to 15 under each CQI meet the specified transmission quality requirement.

Figure 2:
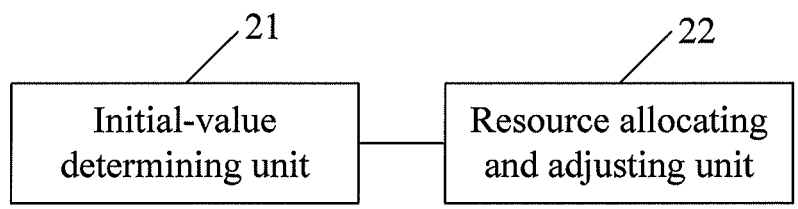
FIG. 2 is a schematic structural diagram of an apparatus for allocating the number of code words and power according to physical channels carrying data according to an embodiment of the present application.

Corresponding to the method shown in FIG. 1, an apparatus for allocating the number of code words and power according to physical channels carrying data is also provided in an embodiment of the present application. As shown in FIG. 2, the apparatus includes:

an initial-value determining unit 21, configured to determine initial power and an initial number of code words; and a resource allocating and adjusting unit 22, configured to adjust the initial power and the initial number of code words in balanced mode according to the resource utilization of data transmission physical channels to select a TBS suitable for data transmission, where the power and the initial number of code words corresponding to the TBS suitable for data transmission are the finally allocated power and number of code words.

The physical channels carrying data may be HS-PDSCHs, and the power and the number of code words may be HS-PDSCH power and the number of HS-PDSCH code words.

The initial-value determining unit 21 may be implemented in various ways. For example, the initial-value determining unit 21 may include: a first calculating unit configured to obtain, according to the currently available maximum power and the CQI that is reported by the UE, a maximum CQI that can be selected currently; and a first determining module, configured to reduce the maximum CQI and the currently available maximum number of code words according to the data traffic to be transmitted in a buffer, and obtain the initial power and the initial number of code words.

The initial-value determining unit 21 may also determine the currently available maximum power as the initial power, and determine the currently available maximum number of code words as the initial number of code words.

The resource utilization in the data transmission physical channels may include a ratio of consumed power of the cell and a ratio of consumed code words of the cell. The ratio of consumed power of the cell is a ratio of allocated power of the cell in a current TTI to the originally available maximum power of the cell in the current TTI. The originally available maximum power of the cell includes the allocated power and unallocated power of the cell in the current TTI. If balanced adjustment is not performed, the allocated power of the cell includes the initial power; if the balanced adjustment is already performed, the allocated power of the cell includes power that is adjusted last time. The ratio of consumed code words of the cell is a ratio of allocated code words of the cell in the current TTI to the originally available maximum number of code words of the cell in the current TTI. The originally available maximum number of code words of the cell includes the number of allocated code words of the cell in the current TTI and the number of unallocated code words of the cell in the current TTI. If the balanced adjustment is not performed, the number of allocated code words of the cell includes the initial number of code words; if the balanced adjustment is already performed, the number of allocated code words of the cell includes the number of code words that is adjusted last time.

The resource allocating and adjusting unit 22 may also be implemented in various ways. For example, the resource allocating and adjusting unit 22 may include: a first judging module, configured to compare the ratio of consumed power of the cell with the ratio of consumed code words of the cell; a first resource adjusting module, configured to adjust resources; if the first judging module determines that the ratio of consumed power of the cell is different from the ratio of consumed code words of the cell, increase a resource with a smaller consumption ratio or reduce a resource with a larger consumption ratio until the first judging module determines that a relationship between the ratio of consumed power of the cell and the ratio of consumed code words of the cell complies with a preset first rule; and select the power and the number of code words that comply with a preset second rule as the finally allocated power and number of code words. For details, see related descriptions of the first rule and the second rule in the method shown in FIG. 1, and are not further described.

The resource utilization in the data transmission physical channels of the cell may include a ratio of remaining power of the cell and a ratio of remaining code words of the cell. The ratio of remaining power of the cell is the ratio of unallocated power of the cell in the current TTI to the originally available maximum power of the cell in the current TH. The originally available maximum power of the cell includes the allocated power and unallocated power of the cell in the current TTI. If the balanced adjustment is not performed, the unallocated power of the cell does not include the initial power; if the balanced adjustment is already performed, the unallocated power of the cell does not include power that is adjusted last time. The ratio of remaining code words of the cell is the ratio of unallocated code words of the cell in the current TTI to the originally available maximum number of code words of the cell in the current TTI. The originally available maximum number of code words of the cell includes the number of allocated code words of the cell in the current TTI and the number of unallocated code words of the cell. If the balanced adjustment is not performed, the number of unallocated code words of the cell does not include the initial number of code words; if the balanced adjustment is already performed, the number of unallocated code words of the cell does not include the number of code words that is adjusted last time.

The resource allocating and adjusting unit 22 may also include: a second judging module, configured to compare the ratio of remaining power of the cell with the ratio of remaining code words of the cell; a second resource adjusting module, configured to adjust resources; if the second judging module determines that the ratio of remaining power of the cell is different from the ratio of remaining code words of the cell, reduce a resource with a smaller remainder ratio until the second judging module determines that the relationship between the ratio of remaining power of the cell and the ratio of remaining code words of the cell complies with a preset third rule; and select the power and the number of code words that comply with a preset fourth rule as the finally allocated power and number of code words.

The resource allocating and adjusting unit 22 may adjust the power by adjusting the CQI. The resource utilization in the data transmission physical channels may further include a maximum number of times the CQI is allowed to reduce continuously and a maximum number of times the number of code words is allowed to reduce continuously. In this case, the resource allocating and adjusting unit 22 may include: a third judging module, configured to compare a currently obtained TBS with the data traffic to be transmitted in a buffer, compare the number of times the CQI is reduced with the maximum number of times the CQI is allowed to reduce continuously or compare the number of times the number of code words are reduced with the maximum number of times the number of code words is allowed to reduce continuously; a third resource adjusting module, configured to: adjust resources; if the third judging module determines that the TBS corresponding to the currently available maximum power and the currently available maximum number of code words is greater than the data traffic to be transmitted in a buffer, reduce a resource corresponding to the larger one of the maximum number of times the CQI is allowed to reduce continuously and the maximum number of times the number of code words is allowed to reduce continuously; if the third judging module determines that an obtained TBS is still greater than the data traffic to be transmitted in the buffer, reduce the resource continuously until the number of times the resource is reduced reaches the maximum number of times the resource is allowed to reduce continuously; if an obtained TBS is still greater than the data traffic to be transmitted in the buffer, reduce another resource; if the third judging module determines that an obtained TBS is still greater than the data traffic to be transmitted in the buffer, reduce the another resource continuously until the number of reductions of the another resource reaches the maximum number of times the another resource is allowed to reduce continuously; if an obtained TBS is still greater than the data traffic to be transmitted in the buffer, reduce the resource reduced at the first time again until a TBS suitable for the data traffic to be transmitted in the buffer is found.

In addition, the resource allocating and adjusting unit may also include: a fourth judging module, configured to compare a currently obtained TBS with the data traffic to be transmitted in the buffer, and compare the ratio of consumed power of the cell with the ratio of consumed code words of the cell; a fourth resource adjusting module, configured to adjust resources; if the fourth judging module determines that the ratio of consumed power of the cell is different from the ratio of consumed code words of the cell, reduce a resource with a larger consumption ratio and maintain a resource with a smaller consumption ratio; if the fourth judging module determines that an obtained TBS is greater than the data traffic to be transmitted in the buffer, reduce a resource corresponding to a larger one of the currently obtained ratio of consumed power of the cell and a ratio of consumed code words of the cell that are obtained by current calculation until a TBS suitable for the data traffic to be transmitted in the buffer is found.

The resource allocating and adjusting unit 22 may further include: a fifth judging module, configured to compare a currently obtained TBS with the data traffic to be transmitted in the buffer, and compare the ratio of consumed power of the cell with the ratio of consumed code words of the cell; a fifth resource adjusting module, configured to adjust resources; if the fifth judging module determines that the ratio of remaining power of the cell is different from the ratio of remaining code words of the cell, reduce a resource with a smaller remainder ratio and maintain a resource with a larger remainder ratio, and re-calculate the ratio of consumed power of the cell and the ratio of consumed code words of the cell according to the currently selected power and code words; if the fifth judging module determines that an obtained TBS is greater than the data traffic to be transmitted in the buffer, reduce a resource corresponding to the smaller one of the re-calculated ratio of remaining power of the cell and the ratio of remaining code words of the cell until a TBS suitable for the data traffic to be transmitted in the buffer is found.

In the balanced adjustment process performed by the resource allocating and adjusting unit 22, after the resource allocating and adjusting unit 22 adjusts the number of code words, it may search the CQI-TBS table for a CQI corresponding to the TBS suitable for data transmission according to the adjusted number of code words. In the CQI-TBS table, the TBSs when the number of code words is 1 to 15 under each CQI meet the specified transmission quality requirement. In the balanced adjustment process performed by the resource allocating and adjusting unit 22, the resource allocating and adjusting unit 22 may adjust the power by adjusting the CQI. After the resource allocating and adjusting unit 22 adjusts the CQI, it may search the CQI-TBS table for the number of code words corresponding to the TBS suitable for data transmission according to the adjusted CQI. In the CQI-TBS table, the TBSs when the number of code words is 1 to 15 under each CQI meet the specified transmission quality requirement.

It should be noted that all the units in the apparatus shown in FIG. 2 may be set or applied on the NodeB. The working modes of these units on the NodeB are the same as those on the apparatus shown in FIG. 2, and are not further described.

To help those skilled in the art better understand the embodiments of the present application, the following describes three embodiments of the present application.

Figure 3:
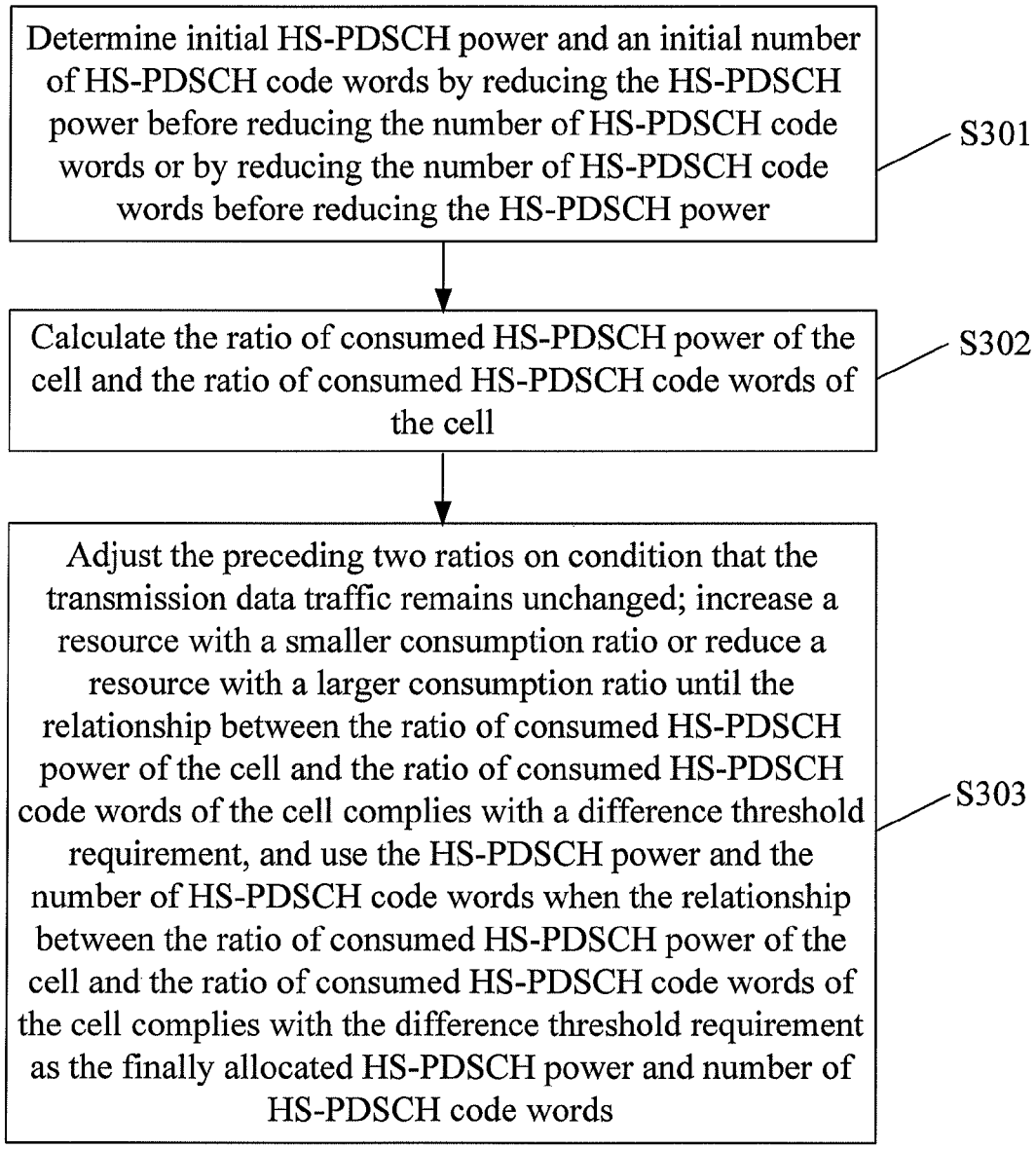
FIG. 3 is a flowchart of a first embodiment of the present application.

The following describes the first embodiment of the present application. As shown in FIG. 3, the embodiment includes the following steps:

Step S301: Determine initial HS-PDSCH power and an initial number of HS-PDSCH code words by reducing HS-PDSCH power before reducing the number of HS-PDSCH code words or by reducing the number of HS-PDSCH code words before reducing the HS-PDSCH power.

The method of reducing the number of HS-PDSCH code words before reducing the HS-PDSCH power is as follows: An available maximum CQI is obtained according to currently available maximum HS-PDSCH power and a CQI that is reported by the UE; a TBS is obtained according to the maximum CQI and the currently available maximum number of HS-PDSCH code words; if the obtained TBS is greater than the data traffic in the buffer, the currently available maximum number of HS-PDSCH code words is reduced and the maximum CQI is maintained; a new TBS is obtained according to the reduced number of HS-PDSCH code words and the maximum CQI; if the new TBS is greater than the data traffic in the buffer, the number of HS-PDSCH code words is reduced on the basis of the reduced number of HS-PDSCH code words, and the maximum CQI is maintained until the number of HS-PDSCH code words is reduced to the currently available minimum number of HS-PDSCH code words. If the obtained TBS is smaller than the data traffic in the buffer in the process of reducing the number of HS-PDSCH code words, the previously selected number of HS-PDSCH code words is used as the initial number of HS-PDSCH code words. Then, the CQI is reduced, and the currently available minimum number of HS-PDSCH code words is maintained; a new TBS is obtained according to the reduced CQI and the selected initial number of HS-PDSCH code words; if the new TBS obtained after reducing the CQI is greater than the data traffic in the buffer, the CQI is reduced on the basis of the reduced CQI, and the selected initial number of HS-PDSCH code words is maintained until the CQI is reduced to the currently available minimum CQI. If the obtained TBS is smaller than the data traffic in the buffer in the process of reducing the CQI, the previously selected number of HS-PDSCH code words is used as the initial number of HS-PDSCH code words, and the HS-PDSCH power obtained according to the previously selected CQI is used as the initial HS-PDSCH power. If the obtained TBS is still greater than the data traffic in the buffer after the CQI is reduced to the currently available minimum CQI under the selected initial number of HS-PDSCH code words, the HS-PDSCH power obtained according to the currently available minimum CQI is used as the initial HS-PDSCH power.

The method of reducing the HS-PDSCH power before reducing the number of HS-PDSCH code words is as follows: A maximum CQI that is available for the UE is obtained according to currently available HS-PDSCH power and a CQI that is reported by the UE; a TBS is obtained according to the maximum CQI and the currently available maximum number of HS-PDSCH code words; if the obtained TBS is greater than the data traffic in the buffer, the maximum CQI is reduced and the currently available maximum number of HS-PDSCH code words is maintained; a new TBS is obtained according to the reduced CQI and the currently available maximum number of HS-PDSCH code words; if the new TBS is greater than the data traffic in the buffer, the CQI is reduced on the basis of the reduced CQI, and the currently available maximum number of HS-PDSCH code words is maintained until the CQI is reduced to the currently available minimum CQI. If the obtained TBS is smaller than the data traffic in the buffer in the process of reducing the CQI, the HS-PDSCH power obtained according to the previously selected CQI is used as the initial HS-PDSCH power. Then, the CQI corresponding to the initial HS-PDSCH power is maintained, and the number of HS-PDSCH code words is reduced; a new TBS is obtained according to the CQI corresponding to the initial HS-PDSCH power and the reduced number of HS-PDSCH code words; if the new TBS obtained after reducing the number of HS-PDSCH code words is greater than the data traffic in the buffer, the number of HS-PDSCH code words is reduced on the basis of the reduced number of HS-PDSCH code words, and the CQI corresponding to the initial HS-PDSCH power is maintained until the number of HS-PDSCH code words is reduced to the currently available minimum number of HS-PDSCH code words. If the obtained TBS is smaller than the data traffic in the buffer in the process of reducing the number of HS-PDSCH code words, the previously selected number of HS-PDSCH code words is used as the initial number of HS-PDSCH code words. If the obtained TBS is still greater than the data traffic in the buffer after the number of HS-PDSCH code words is reduced to the currently available minimum number of HS-PDSCH code words according to the CQI corresponding to the initial HS-PDSCH power, the currently available minimum number of HS-PDSCH code words is used as the initial number of HS-PDSCH code words.

Step S302: Calculate a ratio of consumed HS-PDSCH power of a cell and a ratio of consumed HS-PDSCH code words of the cell.

The ratio of consumed HS-PDSCH power of the cell is a ratio of allocated HS-PDSCH power of the cell to the originally available maximum HS-PDSCH power of the cell in a current TTI. If balanced adjustment is not performed, the allocated HS-PDSCH power of the cell includes the initial HS-PDSCH power; if the balanced adjustment is already performed, the allocated HS-PDSCH power of the cell includes HS-PDSCH power that is adjusted last time. The ratio of consumed HS-PDSCH code words of the cell is a ratio of allocated HS-PDSCH code words of the cell to the originally available maximum number of HS-PDSCH code words in a current TTI; if the balanced adjustment is not performed, the number of allocated HS-PDSCH code words of the cell includes the initial number of HS-PDSCH code words; if the balanced adjustment is already performed, the number of allocated HS-PDSCH code words of the cell includes the number of HS-PDSCH code words that is adjusted last time.

Step S302 may be replaced as follows: Calculate a ratio of remaining HS-PDSCH power of the cell and a ratio of remaining HS-PDSCH code words of the cell.

The ratio of remaining HS-PDSCH power of the cell is a ratio of remaining HS-PDSCH power of the cell that can be allocated to the originally available maximum HS-PDSCH power of the cell in a current TTI. If the balanced adjustment is not performed, the remaining HS-PDSCH power of the cell that can be allocated does not include the initial HS-PDSCH power; if the balanced adjustment is already performed, the remaining HS-PDSCH power of the cell that can be allocated does not include the HS-PDSCH power that is adjusted last time. The ratio of remaining HS-PDSCH code words of the cell is a ratio of remaining HS-PDSCH code words of the cell that can be allocated to the originally available maximum number of HS-PDSCH code words in a current TTI; if the balanced adjustment is not performed, the number of remaining HS-PDSCH code words of the cell that can be allocated does not include the initial number of HS-PDSCH code words; if the balanced adjustment is already performed, the number of remaining HS-PDSCH code words of the cell does not include the number of HS-PDSCH code words that is adjusted last time.

Step S303: When transmission data traffic remains unchanged, adjust the ratio of consumed HS-PDSCH power of the cell and the ratio of consumed HS-PDSCH code words of the cell, increase a resource with a smaller consumption ratio or reduce a resource with a larger consumption ratio until the relationship between the ratio of consumed HS-PDSCH power of the cell and the ratio of consumed HS-PDSCH code words of the cell meets a difference threshold requirement, and use the HS-PDSCH power and the number of HS-PDSCH code words when a relationship between the ratio of consumed HS-PDSCH power of the cell and the ratio of consumed HS-PDSCH code words of the cell meets the requirement as the finally allocated HS-PDSCH power and number of HS-PDSCH code words.

The threshold requirement may be a threshold for the difference between the two ratios. The difference threshold may be positive or negative, or may be an absolute value.

Step S303 may include the following process:

If the ratio of consumed HS-PDSCH power of the cell is greater than the ratio of consumed HS-PDSCH code words of the cell, increase the number of HS-PDSCH code words on the basis of the initial number of HS-PDSCH code words, and obtain a new number of HS-PDSCH code words. Search the CQI-TBS table for a CQI value that is required for transmitting the data in the buffer and corresponds to the new number of HS-PDSCH code words. 3. Calculate new HS-PDSCH power according to the found CQI.

It should be noted that when the number of HS-PDSCH code words is increased, the increasing operation may be performed by using the step 1 or a step of an integer greater than 1. If the increasing operation is performed by using the step 1, the number of HS-PDSCH code words after the increasing operation is equal to the number of HS-PDSCH code words before the increasing operation plus 1. For example, if the number of HS-PDSCH code words before the increasing operation is 7, the number of HS-PDSCH code words after the increasing operation is 8. If the increasing operation is performed by using the step 3, the number of HS-PDSCH code words after the increasing operation is equal to the number of HS-PDSCH code words before the increasing operation plus 3. For example, if the number of HS-PDSCH code words before the increasing operation is 7, the number of HS-PDSCH code words after the increasing operation is 10. 3. After the new HS-PDSCH power and the new number of HS-PDSCH code words are obtained, calculate a new ratio of consumed HS-PDSCH power of the cell according to the new HS-PDSCH power, and calculate a new ratio of consumed HS-PDSCH code words of the cell according to the new number of HS-PDSCH code words. 4. If the new ratio of consumed HS-PDSCH power of the cell is still greater than the new ratio of consumed HS-PDSCH code words of the cell, continue the preceding adjustment process until the relationship between the ratio of consumed HS-PDSCH power of the cell and the ratio of consumed HS-PDSCH code words of the cell meets a difference threshold requirement, use the HS-PDSCH power and the number of HS-PDSCH code words when the relationship between the ratio of consumed HS-PDSCH power of the cell and the ratio of consumed HS-PDSCH code words of the cell meets the difference threshold requirement as the finally allocated HS-PDSCH power and number of HS-PDSCH code words, and then end the preceding adjustment process.

5. If the ratio of consumed HS-PDSCH power of the cell is smaller than the ratio of consumed HS-PDSCH code words of the cell, reduce the number of HS-PDSCH code words on the basis of the initial number of HS-PDSCH code words, and obtain the new number of HS-PDSCH code words. 6. Search the CQI-TBS table for a CQI value that is required for transmitting the data in the buffer and corresponds to a new number of HS-PDSCH code words. 7. Calculate new HS-PDSCH power according to the found CQI.

It should be noted that when the number of HS-PDSCH code words is reduced, the reduction operation may be performed by using the step 1 or a step of an integer greater than 1. If the reduction operation is performed by using the step 1, the number of HS-PDSCH code words after the reduction operation is equal to the number of HS-PDSCH code words before the reduction operation minus 1. For example, if the number of HS-PDSCH code words before the reduction operation is 8, the number of HS-PDSCH code words after the reduction operation is 7. If the reduction operation is performed by using the step 3, the number of HS-PDSCH code words after the reduction operation is equal to the number of HS-PDSCH code words before the reduction operation minus 3. For example, if the number of HS-PDSCH code words before the reduction operation is 10, the number of HS-PDSCH code words after the reduction operation is 7. 8. After new HS-PDSCH power and the new number of HS-PDSCH code words are obtained, calculate a new ratio of consumed HS-PDSCH power of the cell according to the new HS-PDSCH power, and calculate a new ratio of consumed HS-PDSCH code words of the cell according to the new number of HS-PDSCH code words. 9. If the ratio of consumed HS-PDSCH power of the cell is still smaller than the ratio of consumed HS-PDSCH code words of the cell, continue the preceding adjustment process until the relationship between the ratio of consumed HS-PDSCH power of the cell and the ratio of consumed HS-PDSCH code words of the cell meets a difference threshold requirement, use the HS-PDSCH power and the number of HS-PDSCH code words when the relationship between the ratio of consumed HS-PDSCH power of the cell and the ratio of consumed HS-PDSCH code words of the cell meets the difference threshold requirement as the finally allocated HS-PDSCH power and number of HS-PDSCH code words, and then end the preceding adjustment process.

Certainly, the preceding adjustment process may be implemented according to the relationship between the ratio of remaining HS-PDSCH power of the cell and the ratio of remaining HS-PDSCH code words of the cell, which is not further described.

In the embodiment shown in FIG. 3, when the allocation of the number of HS-PDSCH code words and the HS-PDSCH power is adjusted to keep balance, a resource with a smaller consumption ratio is increased or a resource with a larger consumption ratio is reduced, so that the relationship between the ratio of consumed HS-PDSCH power of the cell and the ratio of consumed HS-PDSCH code words of the cell meets the difference threshold requirement. If the HS-PDSCH power and the number of HS-PDSCH code words when the ratio of consumed HS-PDSCH power of the cell is closest to the ratio of consumed HS-PDSCH code words of the cell are used as the finally allocated HS-PDSCH power and number of HS-PDSCH code words, the balance between the ratio of consumed HS-PDSCH power of the cell and the ratio of consumed HS-PDSCH code words of the cell may be achieved. Therefore, by using the embodiment shown in FIG. 3, the HS-PDSCH power and the number of HS-PDSCH code words may be allocated in balanced mode. In the embodiment shown in FIG. 3, when the HS-PDSCH power and the number of HS-PDSCH code words are allocated in a TTI, the HS-PDSCH power and the number of HS-PDSCH code words are allocated in balanced mode. In this way, the case that only the HS-PDSCH power or only the number of HS-PDSCH code words is used up may be prevented, therefore improving the system performance.

For better understanding of the embodiment shown in FIG. 3, the following further describes the embodiment shown in FIG. 3 by taking some examples.

Assuming that the obtained ratio of consumed HS-PDSCH power of the cell is 60% and that the ratio of consumed HS-PDSCH code words of the cell is 20%, it is obvious that the ratio of consumed HS-PDSCH power of the cell is greater than the ratio of consumed HS-PDSCH code words of the cell. Assuming that the initial number of HS-PDSCH code words is 2 and that the obtained new number of HS-PDSCH code words is 3 if the number of HS-PDSCH code words is increased by using the step 2, in the CQI-TBS table, the found CQI value that is required for transmitting the data in the buffer and corresponds to the new number of HS-PDSCH code words is 11. New HS-PDSCH power is obtained according to the CQI value of 11. A new ratio of consumed HS-PDSCH power of the cell is calculated according to the new HS-PDSCH power, and a new ratio of consumed HS-PDSCH code words of the cell is calculated according to the new number of HS-PDSCH code words. Assuming that the new ratio of consumed HS-PDSCH power of the cell is 55% and that the new ratio of consumed HS-PDSCH code words of the cell is 49%, it is obvious that the new ratio of consumed HS-PDSCH power of the cell is still greater than the new ratio of consumed HS-PDSCH code words of the cell. In this case, the number of HS-PDSCH code words is increased by using the step 1, and the obtained new number of HS-PDSCH code words is 4. In the CQI-TBS table, the found CQI value that is required for transmitting the data in the buffer and corresponds to the new number of HS-PDSCH code words is 13. New HS-PDSCH power is obtained according to the CQI value of 13. A new ratio of consumed HS-PDSCH power of the cell is calculated according to the new HS-PDSCH power, and a new ratio of consumed HS-PDSCH code words of the cell is calculated according to the new number of HS-PDSCH code words. Assuming that the new ratio of consumed HS-PDSCH power of the cell is 48% and that the new ratio of consumed HS-PDSCH code words of the cell is 62%, the difference between the new ratio of consumed HS-PDSCH power of the cell and the new ratio of consumed HS-PDSCH code words of the cell is −14%. If the difference threshold requirement is 10%, the newly selected HS-PDSCH power and number of code words fail to meet the requirement. Therefore, the previously selected HS-PDSCH power and number of HS-PDSCH code words are used as the finally allocated HS-PDSCH power and number of HS-PDSCH code words. If the difference threshold requirement is −15%, the newly selected HS-PDSCH power and number of HS-PDSCH code words may meet the requirement and therefore are used as the finally allocated HS-PDSCH power and number of HS-PDSCH code words.

Assuming that the obtained ratio of consumed HS-PDSCH power of the cell is 65% and that the ratio of consumed HS-PDSCH code words of the cell is 69%, it is obvious that the ratio of consumed HS-PDSCH power of the cell is smaller than the ratio of consumed HS-PDSCH code words of the cell. Assuming that the initial number of HS-PDSCH code words is 4 and that the obtained new number of HS-PDSCH code words is 3 if the number of HS-PDSCH code words is reduced by using the step 1, in the CQI-TBS table, the found CQI value that is required for transmitting the data in the buffer and corresponds to the new number of HS-PDSCH code words is 11. New HS-PDSCH power is obtained according to the CQI value of 11. A new ratio of consumed HS-PDSCH power of the cell is calculated according to the new HS-PDSCH power, and a new ratio of consumed HS-PDSCH code words of the cell is calculated according to the new number of HS-PDSCH code words. Assuming that the new ratio of consumed HS-PDSCH power of the cell is 62% and that the new ratio of consumed HS-PDSCH code words of the cell is 59%, the difference between the new ratio of consumed HS-PDSCH power of the cell and the new ratio of consumed HS-PDSCH code words of the cell is −3%. If the difference threshold requirement is ±3%, the difference between the newly selected HS-PDSCH power and number of HS-PDSCH code words is closer to the difference threshold than the previous one. Therefore, the HS-PDSCH power and number of HS-PDSCH code words corresponding to the adjusted CQI are used as the finally allocated HS-PDSCH power and number of HS-PDSCH code words.

Figure 4:
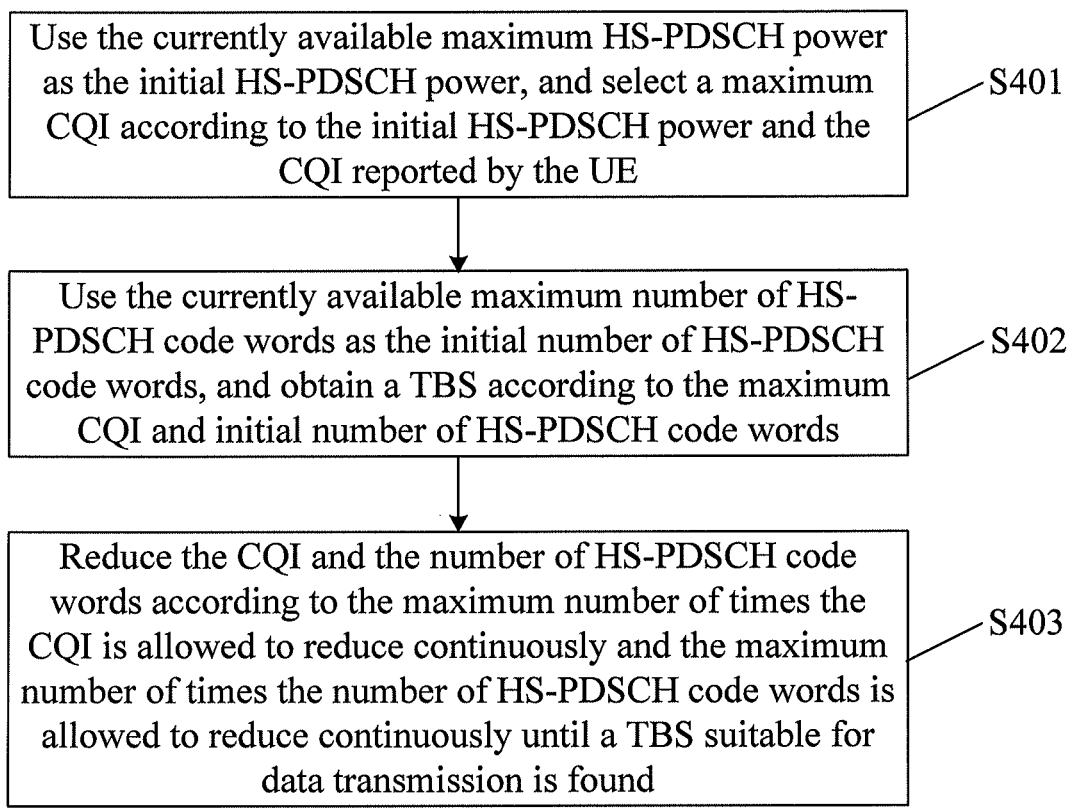
FIG. 4 is a flowchart of a second embodiment of the present application.

The following describes the second embodiment of the present application. As shown in FIG. 4, the embodiment includes the following steps:

Step S401: Use currently available maximum HS-PDSCH power as the initial HS-PDSCH power, and select a maximum CQI according to the initial HS-PDSCH power and the CQI that is reported by the UE.

Specifically, the currently available maximum HS-PDSCH power may be current maximum HS-PDSCH power of the cell that can be allocated or available maximum HS-PDSCH power for the data transmission under the policy restriction.

Step S402: Use the currently available maximum number of HS-PDSCH code words as the initial number of HS-PDSCH code words, and obtain a TBS according to the maximum CQI and initial number of HS-PDSCH code words.

Specifically, the currently available maximum number of HS-PDSCH code words may be a current maximum number of HS-PDSCH code words of the cell that can be allocated or an available maximum number of HS-PDSCH code words for data transmission that the UE may support or an available maximum number of HS-PDSCH code words for data transmission under the policy restriction.

Step S403: Reduce the CQI and the number of HS-PDSCH code words according to the maximum number of times the CQI is allowed to reduce continuously and the maximum number of times the number of HS-PDSCH code words is allowed to continuously reduce code words until a TBS suitable for data transmission is found.

Specifically, if the TBS obtained according to the maximum CQI and the currently available maximum number of HS-PDSCH code words is greater than the data traffic in the buffer, a resource with a larger number of times continuous reduction is allowed (that is, the resource with a larger consumption ratio within a recent period of time) is reduced on a cyclic basis; if the larger number of times continuous reduction is allowed for the resource reaches the number of times continuous reduction is allowed for the resource and the obtained TBS is still greater than the data traffic in the buffer, a resource with a smaller number of times continuous reduction is allowed is reduced on a cyclic basis; if the smaller number of times continuous reduction is allowed for the resource reaches the number of times continuous reduction is allowed for the resource and the obtained TBS is still greater than the data traffic in the buffer, reduce the resource with a larger number of times continuous reduction is allowed again until a minimum TBS suitable for the data traffic in the buffer is found. Then, the number of HS-PDSCH code words corresponding to the minimum TBS suitable for the data traffic in the buffer is used as the finally allocated number of HS-PDSCH code words, and the HS-PDSCH power obtained according to the CQI corresponding to the minimum TBS suitable for data traffic in the buffer is used as the finally allocated HS-PDSCH power.

Further, if the TBS selected according to the maximum CQI and the currently available maximum number of HS-PDSCH code words is greater than the data traffic to be transmitted in the buffer, the threshold for the number of times the CQI is reduced (cqiCnt) is compared with the threshold for the number of times the number of HS-PDSCH code words is reduced (NocCnt); if the cqiCnt threshold is not smaller than the NocCnt threshold, the CQI is reduced firstly; otherwise the number of HS-PDSCH code words is reduced firstly.

Taking the CQI reduction as an example, the selected number of code words remains unchanged under the CQI corresponding to the selected HS-PDSCH power and the currently selected number of HS-PDSCH code words. If the selected TBS after the CQI is reduced once is still greater than the data traffic in the buffer, the CQI is reduced continuously; otherwise the HS-PDSCH power and number of HS-PDSCH code words obtained before the CQI is reduced are used as the finally allocated HS-PDSCH power and number of HS-PDSCH code words.

If the number of times the CQI is allowed to reduce continuously reaches the cqiCnt threshold and the selected TBS is still greater than the data traffic in the buffer, the CQI corresponding to the selected HS-PDSCH power is maintained, and the number of HS-PDSCH code words is reduced.

If the TBS selected after the number of HS-PDSCH code words is reduced once is still greater than the data traffic in the buffer, the number of HS-PDSCH code words is reduced continuously; otherwise, the HS-PDSCH power and number of HS-PDSCH code words obtained before the number of HS-PDSCH code words is reduced are used as the finally allocated HS-PDSCH power and number of HS-PDSCH code words.

If the number of times the number of HS-PDSCH code words is allowed to continuously reduce code words reaches the nocCnt threshold and the selected TBS is still greater than the data traffic in the buffer, the CQI is reduced again.

The reduction is performed on a cyclic basis until a minimum TBS suitable for the data traffic in the buffer is found. Finally, the number of HS-PDSCH code words corresponding to the selected TBS is used as the finally allocated number of HS-PDSCH code words, and the HS-PDSCH power obtained according to the CQI corresponding to the selected TBS is used as the finally allocated HS-PDSCH power.

It should be noted that the maximum number of the HS-PDSCH power is allowed to reduce continuously and the maximum number of times the number of HS-PDSCH code words is allowed to reduce continuously may be adjusted from time to time.

Specifically, the cqiCnt threshold and the NocCnt threshold may be preset or adjusted periodically. For example, by using y (an integer not smaller than 1) TTIs as a period, the cqiCnt threshold and the NocCnt threshold are adjusted according to the average value of utilization of the HS-PDSCH power within x (x is an integer not smaller than 1 and the relationship between x and y may not be limited) TTIs and the average value of utilization of the number of HS-PDSCH code words within x TTIs. If the average value of utilization of the HS-PDSCH power within x TTIs is greater than the average value of utilization of the number of HS-PDSCH code words within x TTIs, the cqiCnt threshold is increased, and the NocCnt threshold is reduced; otherwise, the NocCnt threshold is increased, and the cqiCnt threshold is reduced.

The CQI, the number of HS-PDSCH code words, the cqiCnt threshold, and the NocCnt threshold (including the adjusted step) may be adjusted with reference to the embodiment shown in FIG. 3.

When a TBS is obtained according to the CQI and the number of HS-PDSCH code words, the CQI-TBS table may be searched for TBSs corresponding to the CQI and the number of HS-PDSCH code words. In the CQI-TBS table, the TBSs when the number of HS-PDSCH code words is 1 to 15 corresponding to each CQI meet the requirement of the 10% BLER.

In the embodiment shown in FIG. 4, when the allocation of the number of HS-PDSCH code words and the HS-PDSCH power is balanced, a resource with a larger consumption ratio is reduced firstly, followed by a resource with a smaller consumption ratio. This reduction is performed on a cyclic basis until a minimum TBS suitable for the data traffic in the buffer is found. By reducing the resources in sequence and on a cyclic basis, the HS-PDSCH power and the number of HS-PDSCH code words may be allocated in balanced mode. For better understanding of the embodiment shown in FIG. 4, the following further describes the embodiment shown in FIG. 4 by taking some examples.

It is assumed that the available maximum CQI is 17 according to the currently available maximum HS-PDSCH power and the CQI that is reported by the UE. Assuming that the currently available maximum number of HS-PDSCH code words is 5 and that the data traffic to be transmitted in the buffer is 2509, it may be found in the CQI-TBS table that the TBS selected according to the assumptions is 4189. It is obvious that the selected TBS is greater than the data traffic to be transmitted in the buffer. Assuming that the cqiCnt threshold is 2 and that the NocCnt threshold is 1, it is obvious that the cqiCnt threshold is greater than the NocCnt threshold. In this case, the CQI is reduced by using the step 1, and the reduced CQI is 16. It is found in the CQI-TBS table that the TBS is 3565. This TBS is still greater than the data traffic in the buffer. The CQI is reduced continuously by using the step 1, and the reduced CQI is 15. It is found in the CQI-TBS table that the TBS is 3319. This TBS is still greater than the data traffic in the buffer, but the number of times the CQI is reduced already reaches the cqiCnt threshold. In this case, the number of HS-PDSCH code words is reduced by using the step 1. The number of HS-PDSCH code words is 4 upon the reduction. It is found in the CQI-TBS table that the TBS is 2623 (this is an assumed value; a large error may exist between the actual value and this value). This TBS is still greater than the data traffic in the buffer. Because the number of times the number of HS-PDSCH code words is reduced already reaches the NocCnt threshold, the CQI is reduced again by using the step 1, and the reduced CQI is 14. It is found in the CQI-TBS table that the TBS is 2583. This TBS is still greater than the data traffic in the buffer. The CQI is reduced continuously by using the step 1, and the reduced CQI is 13. It is found in the CQI-TBS table that the TBS is 2279. Because this TBS is smaller than the data traffic in the buffer, a transport block whose TBS is 2583 is selected to transmit the data in the buffer. Finally, the HS-PDSCH power corresponding to the CQI of 14 is used as the finally allocated HS-PDSCH power, and the finally allocated number of HS-PDSCH code words is 4.

Figure 5:
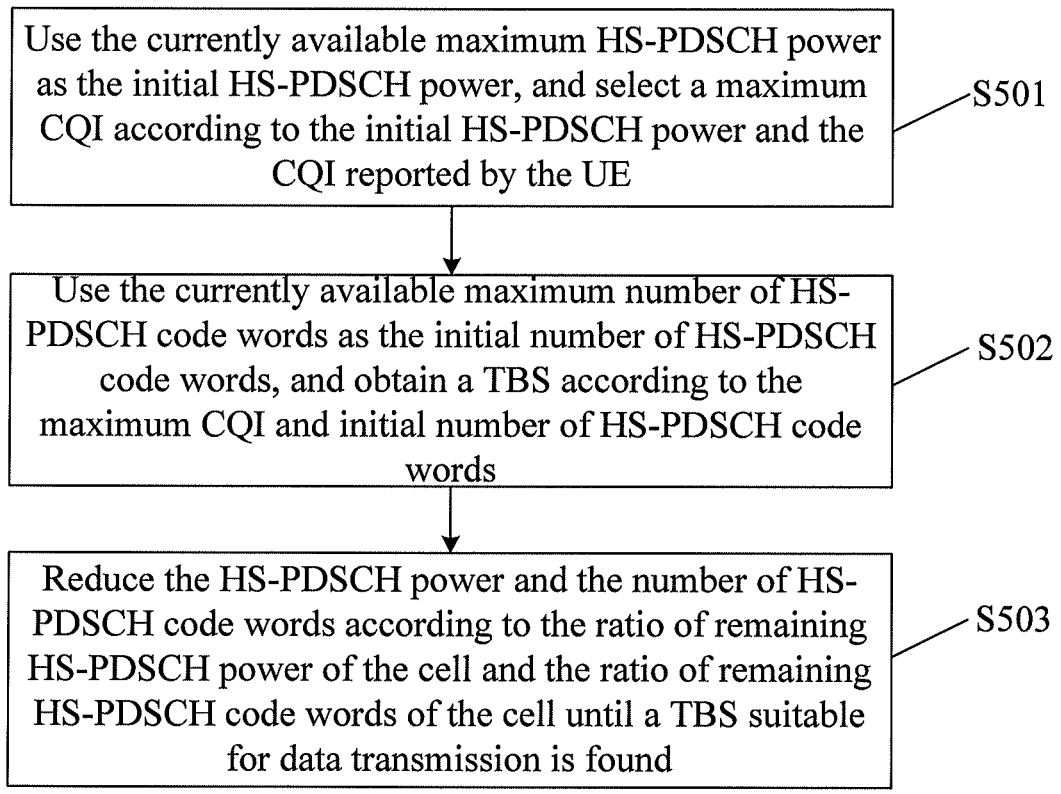
FIG. 5 is a flowchart of a third embodiment of the present application.

The following describes the third embodiment of the present application. As shown in FIG. 5, the embodiment includes the following steps:

Step S501: Use a currently available maximum HS-PDSCH power as an initial HS-PDSCH power, and select a maximum CQI according to the initial HS-PDSCH power and the CQI that is reported by the UE.

Specifically, the currently available maximum HS-PDSCH power may be current maximum HS-PDSCH power of the cell that can be allocated or available maximum HS-PDSCH power for the data transmission under the policy restriction.

Step S502: Use a currently available maximum number of HS-PDSCH code words as the initial number of HS-PDSCH code words, and obtain a TBS according to the maximum CQI and initial number of HS-PDSCH code words.

Specifically, the currently available maximum number of HS-PDSCH code words may be the maximum number of HS-PDSCH code words of the cell that can be allocated or the available maximum number of HS-PDSCH code words for data transmission that the UE may support or the available maximum number of HS-PDSCH code words for data transmission under the policy restriction.

Step S503: Reduce the HS-PDSCH power and the number of HS-PDSCH code words according to the ratio of remaining HS-PDSCH power of the cell and the ratio of remaining HS-PDSCH code words of the cell until a TBS suitable for data transmission is found.

Specifically, if the TBS obtained according to the maximum CQI and the currently available maximum number of HS-PDSCH code words is greater than the data traffic in the buffer, a resource with a smaller remainder ratio is reduced until a minimum TBS suitable for the data traffic in the buffer is obtained. The HS-PDSCH power obtained according to the CQI corresponding to the minimum CQI is used as the finally allocated HS-PDSCH power, and the number of HS-PDSCH code words corresponding to the minimum TBS is used as the finally allocated number of HS-PDSCH code words. The remainder ratio is a ratio of remaining resource of the cell to the originally available maximum resource of the cell in a current TTI. The HS-PDSCH power may be reduced by reducing the CQI.

Specifically, the available maximum CQI and the maximum number of HS-PDSCH code words according to the currently available maximum resource may be obtained firstly.

If the TBS that is found in the CQI-TBS table according to the maximum CQI and the maximum number of HS-PDSCH code words is greater than the data traffic to be transmitted in the buffer, the CQI or the number of HS-PDSCH code words is reduced. The adjustment process is as follows:

Compare a ratio of remaining HS-PDSCH power of a cell with a ratio of remaining HS-PDSCH code words of the cell, where the ratio of remaining HS-PDSCH power of the cell is a ratio of remaining HS-PDSCH power of the cell to the originally available maximum HS-PDSCH power of the cell in a current TTI, and the ratio of remaining HS-PDSCH code words of the cell is a ratio of remaining HS-PDSCH code words of the cell to the originally available maximum number of HS-PDSCH code words of the cell in the current TTI.

If the ratio of remaining HS-PDSCH power is small, reduce the CQI, and maintain the number of HS-PDSCH code words; otherwise, reduce the number of HS-PDSCH code words and maintain the CQI. 3. After reducing the CQI or the number of HS-PDSCH code words, search the CQI-TBS table for a TBS.

If the found TBS is greater than the data traffic in the buffer, continue to calculate the ratio of remaining HS-PDSCH power of the cell and the ratio of remaining HS-PDSCH code words of the cell according to the currently selected CQI and number of HS-PDSCH code words, and continue to adjust the CQI or the number of HS-PDSCH code words according to the ratio of remaining HS-PDSCH power of the cell and the ratio of remaining HS-PDSCH code words of the cell.

When the found TBS is smaller than the data traffic in the buffer, use the previously selected number of HS-PDSCH code words as the finally allocated number of HS-PDSCH code words and the previously selected HS-PDSCH power corresponding to the CQI as the finally allocated HS-PDSCH power.

The HS-PDSCH power and the number of HS-PDSCH code words may also be adjusted according to the relationship between the ratio of consumed HS-PDSCH power of the cell and the ratio of consumed HS-PDSCH code words of the cell, which is not further described.

The CQI and the number of HS-PDSCH code words (including the adjusted step) may be adjusted with reference to the embodiment shown in FIG. 3.

In the CQI-TBS table, the TBSs when the number of HS-PDSCH code words is 1 to 15 corresponding to each CQI meet the requirement of the 10% BLER.

In the embodiment shown in FIG. 5, the resource with a smaller remainder ratio is reduced on a cyclic basis, so that the balance between the ratio of remaining HS-PDSCH power and the ratio of remaining HS-PDSCH code words is secured. In this way, the HS-PDSCH power and the number of HS-PDSCH code words are allocated in balanced mode.

For better understanding of the embodiment shown in FIG. 5, the following further describes the embodiment shown in FIG. 5 by taking some examples.

It is assumed that the available maximum CQI is 15 and that the available maximum number of HS-PDSCH code words is 5 according to the currently available resource. It is found in the CQI-TBS table that the TBS selected according to the assumptions is 3319. It is assumed that the data traffic to be transmitted in the buffer is 2019. This TBS is greater than the data traffic in the buffer. It is assumed that the ratio of remaining HS-PDSCH power is 55% and that the ratio of remaining HS-PDSCH code words is 60%. It is obvious that the ratio of remaining HS-PDSCH power is smaller than the ratio of remaining HS-PDSCH code words. In this case, the CQI is reduced by using the step 1, and the reduced CQI is 14. It is found in the CQI-TBS table that the TBS is 2728 (it is an assumed value, which may have a big error from the actual value). This TBS is still greater than the data traffic in the buffer. It is assumed that the ratio of remaining HS-PDSCH power is 62% and that the ratio of remaining HS-PDSCH code words is 60% when the CQI is 14 and the number of HS-PDSCH code words is 5. Obviously, the ratio of remaining HS-PDSCH power is greater than the ratio of remaining HS-PDSCH code words. In this case, the number of HS-PDSCH code words is reduced by using the step 1, and the reduced number of HS-PDSCH code words is 4. It is found in the CQI-TBS table that the TBS is 2583. This TBS is still greater than the data traffic in the buffer. It is assumed that the ratio of remaining HS-PDSCH power is 62% and that the ratio of remaining HS-PDSCH code words is 70% when the CQI is 14 and the number of HS-PDSCH code words is 4. It is obvious that the ratio of remaining HS-PDSCH power is still smaller than the ratio of remaining HS-PDSCH code words. In this case, the CQI is reduced by using the step 1, and the reduced CQI is 13. It is found in the CQI-TBS table that the TBS is 2279. This TBS is still greater than the data traffic in the buffer. It is assumed that the ratio of remaining HS-PDSCH power is 69% and that the ratio of remaining HS-PDSCH code words is 70% when the CQI is 13 and the number of HS-PDSCH code words is 4. It is obvious that the ratio of remaining HS-PDSCH power is still smaller than the ratio of remaining HS-PDSCH code words. In this case, the CQI is reduced by using the step 1, and the reduced CQI is 12. It is found in the CQI-TBS table that the TBS is 1802 (this is an assumed value, which may have a big error from the actual value). This TBS is already smaller than the data traffic in the buffer. Therefore, the HS-PDSCH power corresponding to the fact that the TBS is 2279 and that the CQI is 13 is used as the finally allocated HS-PDSCH power, and the finally allocated number of HS-PDSCH code words is 4.

Because the CQI-TBS table is involved in the preceding description, the following describes the CQI-TBS table. Release 5 provides a CQI table for UEs on different capability levels. Table 1 lists CQIs on the basis of the capability level 10.

TABLE 1

| CQI or CQI$_s$ value | Transport Block Size | Number of HS-PDSCH Channel Codes | Modulation | Reference Power Adjustment Δ | NIR | Xrv or Xrvpb |
|---|---|---|---|---|---|---|
| 0 | N/A | | | Out of range | | |
| 1 | 137 | 1 | QPSK | 0 | 28800 | 0 |
| 2 | 173 | 1 | QPSK | 0 | | |
| 3 | 233 | 1 | QPSK | 0 | | |
| 4 | 317 | 1 | QPSK | 0 | | |
| 5 | 377 | 1 | QPSK | 0 | | |
| 6 | 461 | 1 | QPSK | 0 | | |
| 7 | 650 | 2 | QPSK | 0 | | |
| 8 | 792 | 2 | QPSK | 0 | | |
| 9 | 931 | 2 | QPSK | 0 | | |
| 10 | 1262 | 3 | QPSK | 0 | | |
| 11 | 1483 | 3 | QPSK | 0 | | |
| 12 | 1742 | 3 | QPSK | 0 | | |
| 13 | 2279 | 4 | QPSK | 0 | | |
| 14 | 2583 | 4 | QPSK | 0 | | |
| 15 | 3319 | 5 | QPSK | 0 | | |
| 16 | 3565 | 5 | 16-QAM | 0 | | |
| 17 | 4189 | 5 | 16-QAM | 0 | | |
| 18 | 4664 | 5 | 16-QAM | 0 | | |
| 19 | 5287 | 5 | 16-QAM | 0 | | |
| 20 | 5887 | 5 | 16-QAM | 0 | | |
| 21 | 6554 | 5 | 16-QAM | 0 | | |
| 22 | 7168 | 5 | 16-QAM | 0 | | |
| 23 | 9719 | 7 | 16-QAM | 0 | | |
| 24 | 11418 | 8 | 16-QAM | 0 | | |
| 25 | 14411 | 10 | 16-QAM | 0 | | |
| 26 | 17237 | 12 | 16-QAM | 0 | | |
| 27 | 21754 | 15 | 16-QAM | 0 | | |
| 28 | 23370 | 15 | 16-QAM | 0 | | |
| 29 | 24222 | 15 | 16-QAM | 0 | | |
| 30 | 25558 | 15 | 16-QAM | 0 | | |

According to table 1, Release 5 defines only the TBS corresponding to the typical CQI and number of HS-PDSCH code words. TBSs that meet the requirement of the 10% BLER may be obtained by extending Table 1 when the number of HS-PDSCH code words is 1 to 15 corresponding to each CQI. Table 2 is an extended CQI table.

TABLE 2

| TBS | Codeword 1 | 2 | ... | 15 |
|---|---|---|---|---|
| CQI 1 | 137 | ... | ... | |
| 2 | 173 | ... | ... | |
| 3 | 233 | ... | ... | |
| ... | ... | ... | ... | |
| 30 | ... | ... | ... | 25558 |

It is understandable to those skilled in the art that all or some of the steps in the preceding embodiments may be implemented by related hardware instructed by a program. The program may be stored in a computer readable storage medium. When the program is executed, the processes of the preceding methods are executed. The preceding storage medium may be a magnetic disk, a compact disk-read only memory (CD-ROM), a read only memory (ROM), or a random access memory (RAM).

It should be noted that the above descriptions are merely exemplary embodiments of the present application. Various improvements and refinements made by those skilled in the art without departing from the principle of the present application shall fall within the scope of the claims.

What is claimed is:

1. A method for allocating power and the number of code words according to physical channels carrying data, comprising:

determining an initial power and an initial number of code words; and adjusting the initial power and the initial number of code words in a balanced mode according to a resource utilization of data transmission physical channels to select a transport block size (TBS) suitable for data transmission, wherein a power corresponding to the selected TBS is taked as an allocated power, and the number of code words corresponding to the TBS is taken as the allocated number of code words;

wherein the initial power is a currently available maximum power and the initial number of code words is a currently available maximum number of code words;

the currently available maximum power is one of: a currently available maximum power of a cell and a currently available maximum power that complies with a preset rule; and the currently available maximum number of code words is one of: a currently available maximum number of code words of a cell, a currently available maximum number of code words that complies with a preset rule, and a currently available maximum number of code words that a user equipment (UE) supports.

2. The method of claim 1, wherein determining the initial power and the initial number of code words comprises:

obtaining, according to the currently available maximum power and a channel quality indicator (CQI) that is reported by the UE, a maximum CQI that can be selected currently; and reducing the maximum CQI and the currently available maximum number of code words according to data traffic to be transmitted in a buffer to obtain the initial power and the initial number of code words.

3. The method of claim 2, wherein the step of reducing the maximum CQI and the currently available maximum number of code words according to the data traffic to be transmitted in the buffer to obtain the initial power and the initial number of code words comprises:

while the currently available maximum number of code words remains unchanged,
reducing the maximum CQI;
if an obtained TBS is greater than or equal to the data traffic to be transmitted in the buffer, reducing the CQI continuously until the obtained TBS is smaller than the data traffic to be transmitted in the buffer, and restoring a currently selected CQI to a previously selected CQI,
after the currently available maximum number of code words changes, while the previously selected CQI remains unchanged,
reducing the currently available number of code words;
if an obtained TBS is greater than or equal to the data traffic to be transmitted in the buffer, reducing the number of code words continuously until the obtained TBS is smaller than the data traffic to be transmitted in the buffer, and restoring a currently selected number of code words to a previously selected number of code words, and taking the power corresponding to the previously selected CQI as the initial power and the previously selected number of code words as the initial number of code words.

4. The method of claim 2, wherein the step of reducing the maximum CQI and the currently available maximum number of code words according to the data traffic to be transmitted in the buffer to obtain the initial power and the initial number of code words comprises:

while the maximum CQI remains unchanged,
reducing the currently available maximum number of code words;
if an obtained TBS is greater than or equal to the data traffic to be transmitted in the buffer, reducing the number of code words continuously until the obtained TBS is smaller than the data traffic to be transmitted in the buffer, and restoring a currently selected number of code words to a previously selected number of code words,
after the maximum CQI changes, while the previously selected number of code words remains unchanged,
reducing the maximum CQI;
if an obtained TBS is greater than or equal to the data traffic to be transmitted in the buffer, reducing the CQI continuously until the obtained TBS is smaller than the data traffic to be transmitted in the buffer, and restoring a currently selected CQI to a previously selected CQI, and using power corresponding to the previously selected CQI as the initial power and the previously selected number of code words as the initial number of code words.

5. The method of claims 1, wherein the resource utilization in the data transmission physical channels comprises a ratio of consumed power of a cell and a ratio of consumed code words of a cell, wherein:

the ratio of consumed power of the cell is a ratio of allocated power of the cell within a current transmission time interval (TTI) to originally available maximum power of the cell within the current TTI, wherein the originally available maximum power of the cell comprises the allocated power and unallocated power of the cell within the current TTI; if balanced adjustment is not performed, the allocated power of the cell comprises the initial power; if the balanced adjustment is already performed, the allocated power of the cell comprises power that is adjusted last time; and the ratio of consumed code words of the cell is a ratio of allocated code words of the cell within the TTI to the originally available maximum number of code words of the cell within the current TTI, wherein the originally available maximum number of code words of the cell comprises the number of allocated code words of the cell and the number of unallocated code words of the cell within the current TTI; if the balanced adjustment is not performed, the number of allocated code words of the cell comprises the initial number of code words; if the balanced adjustment is already performed, the number of allocated code words of the cell comprises the number of code words that is adjusted last time.

6. The method of claim 5, wherein adjusting the initial power and the initial number of code words in balanced mode according to the resource utilization in the data transmission physical channels of the cell to select a TBS suitable for data transmission comprises:

if the ratio of consumed power of the cell is different from the ratio of consumed code words of the cell, performing one of increasing a resource with a smaller consumption ratio and reducing a resource with a larger consumption ratio until a relationship between the ratio of consumed power of the cell and the ratio of consumed code words of the cell complies with a preset first rule, and selecting a power and a number of code words that comply with a preset second rule as the allocated power and number of code words respectively.

7. The method of claim 5, wherein adjusting the initial power and the initial number of code words in balanced mode according to the resource utilization in the data transmission physical channels of the cell to select a TBS suitable for data transmission comprises:

if the ratio of consumed power of the cell is different from the ratio of consumed code words of the cell, reducing a resource with a larger consumption ratio and maintaining a resource with a smaller consumption ratio; if an obtained TBS is greater than the data traffic to be transmitted in the buffer, reducing a resource corresponding to the larger of a ratio of consumed power of the cell and a ratio of consumed code words of the cell that are obtained by current calculation until a TBS suitable for the data traffic to be transmitted in the buffer is found.

8. The method of claim 1, wherein the resource utilization in the data transmission physical channels of the cell comprises a ratio of remaining power of a cell and a ratio of remaining code words of the cell, wherein:

the ratio of remaining power of the cell is a ratio of unallocated power of the cell within a current transmission time interval (TTI) to the originally available maximum power of the cell within the current TTI, wherein the originally available maximum power of the cell comprises allocated power and unallocated power of the cell within the current TTI; if the balanced adjustment is not performed, the unallocated power of the cell does not comprise the initial power; if the balanced adjustment is already performed, the unallocated power of the cell does not comprise power that is adjusted last time; and the ratio of remaining code words of the cell is a ratio of unallocated code words of the cell within the TTI to the originally available maximum number of code words of the cell within the current TTI, wherein the originally available maximum number of code words of the cell comprises the number of allocated code words of the cell and the number of unallocated code words of the cell within the current TTI; if the balanced adjustment is not performed, the number of unallocated code words of the cell does not comprise the initial number of code words; if the balanced adjustment is already performed, the number of unallocated code words of the cell does not comprise the number of code words that is adjusted last time.

9. The method of claim 8, wherein adjusting the initial power and the initial number of code words in balanced mode according to the resource utilization in the data transmission physical channels of the cell to select a TBS suitable for data transmission comprises:
if the ratio of remaining power of the cell is different from the ratio of remaining code words of the cell, performing one of: reducing a resource with a smaller remainder ratio, and increasing a resource with a larger remainder ratio, until a relationship between the ratio of remaining power of the cell and the ratio of remaining code words of the cell complies with a preset third rule, and selecting the power and the number of code words that comply with a preset fourth rule as the allocated power and the number of code words respectively.

10. The method of claim 8, wherein adjusting the initial power and the initial number of code words in balanced mode according to the resource utilization in the data transmission physical channels of the cell to select a TBS suitable for data transmission comprises:
if the ratio of remaining power of the cell is different from the ratio of remaining code words of the cell, reducing a resource with a smaller remainder ratio and maintaining a resource with a larger remainder ratio; if the obtained TBS is greater than the data traffic to be transmitted in the buffer, reducing a resource corresponding to a smaller one of a ratio of remaining power of the cell and a ratio of remaining code words of the cell that are obtained by current calculation until a TBS suitable for the data traffic to be transmitted in the buffer is found.

11. The method of claim 1, wherein adjusting the initial power in balanced mode is implemented by adjusting a CQI, the resource utilization in the data transmission physical channels comprises the maximum number of times that the CQI is allowed to reduce continuously and the maximum number of times that the number of code words is allowed to reduce continuously; wherein the maximum number of times that the CQI is allowed to continuously reduce is adjusted according to average power utilization, and the maximum number of times that the number of code words is allowed to continuously reduce is adjusted according to an average utilization of the number of code words, wherein:
the average power utilization is an average value of allocated power of the cell within each of at least one recent TTI; and
the average utilization of the number of code words is an average value of the number of allocated code words of the cell within each of the at least one recent TTI.

12. The method of claim 11, wherein adjusting the initial power and the initial number of code words in balanced mode according to the resource utilization in the data transmission physical channels of the cell to select a TBS suitable for data transmission comprises:
if a TBS corresponding to the currently available maximum power and the currently available maximum number of code words is greater than data traffic to be transmitted in a buffer, reducing a resource corresponding to a larger of: the maximum number of times that the CQI is allowed to continuously reduce and the maximum number of times that the number of code words is allowed to continuously reduce;
if an obtained TBS is still greater than the data traffic to be transmitted in the buffer, reducing the resource continuously until a number of times the resource is reduced reaches the maximum number of times the resource is allowed to reduce continuously; and if the obtained TBS is still greater than the data traffic to be transmitted in the buffer, reducing another resource; and
if the obtained TBS is still greater than the data traffic to be transmitted in the buffer, reducing the other resource continuously until a maximum number of times the other resource is reduced reaches a maximum number of times the other resource is allowed to reduce continuously; and if the obtained TBS is still greater than the data traffic to be transmitted in the buffer, reducing the first resource again until a TBS suitable for the data traffic to be transmitted in the buffer is found.

13. The method of claim 1, wherein:
in adjusting the initial power and the initial number of code words in balanced mode, after the number of code words is adjusted, a channel quality indicator (CQI)-TBS table is searched for a CQI corresponding to the TBS suitable for data transmission according to a currently adjusted number of code words, wherein TBSs in the CQI-TBS table when the number of code words is 1 to 15 corresponding to each CQI meet a specified transmission quality requirement; and
in adjusting the initial power and the initial number of code words in balanced mode, the power is adjusted by adjusting a CQI; after the CQI is adjusted, the CQI-TBS table is searched for the number of code words corresponding to the TBS suitable for data transmission according to the currently adjusted CQI, wherein the TBSs in the CQI-TBS table when the number of code words is 1 to 15 corresponding to each CQI meet the specified transmission quality requirement.

14. The method of claim 1, wherein the physical channels carrying data are high speed physical data sharing channels (HS-PDSCHs) and the allocated power and number of code words are respectively HS-PDSCH power and the number of code words allocated to the same the UE for data transmission.

15. An apparatus for allocating a number of code words and power according to physical channels carrying data, comprising:
an initial-value determining unit configured to determine initial power and an initial number of code words; and
a resource allocating and adjusting unit configured to adjust the initial power and the initial number of code words in balanced mode according to resource utilization of data transmission physical channels to select a transport block size (TBS) suitable for data transmission, wherein the power and the initial number of code words corresponding to the TBS suitable for data transmission are allocated power and number of code words;
wherein the initial power is a currently available maximum power and the initial number of code words is a currently available maximum number of code words;
the currently available maximum power is one of: a currently available maximum power of a cell and a currently available maximum power that complies with a preset rule; and
the currently available maximum number of code words is one of: a currently available maximum number of code words of a cell, a currently available maximum number of code words that complies with a preset rule, and a currently available maximum number of code words that a user equipment (UE) supports.

16. The apparatus of claim 15, wherein the initial-value determining unit comprises:
a first calculating module configured to calculate, according to the currently available maximum power and a channel quality indicator (CQI) that is reported by the UE, a maximum CQI that can be selected currently; and
a first determining module configured to reduce the maximum CQI and the currently available maximum number of code words according to data traffic to be transmitted in a buffer, and obtain the initial power and the initial number of code words.

17. The apparatus of claim 16, wherein the resource utilization in the data transmission physical channels comprises a ratio of consumed power of a cell and a ratio of consumed code words of a cell, wherein:
the ratio of consumed power of the cell is a ratio of allocated power of the cell within a current transmission time interval (TTI) to originally available maximum power of the cell within the current TTI, wherein the originally available maximum power of the cell comprises allocated power and unallocated power of the cell within the current TTI; if balanced adjustment is not performed, the allocated power of the cell comprises the initial power; if the balanced adjustment is already performed, the allocated power of the cell comprises power that is adjusted last time; and
the ratio of consumed code words of the cell is a ratio of allocated code words of the cell within the TTI to the originally available maximum number of code words of the cell within the current TTI, wherein the originally available maximum number of code words of the cell comprises the number of allocated code words of the cell and the number of unallocated code words of the cell within the current TTI; if the balanced adjustment is not performed, the number of allocated code words of the cell comprises the initial number of code words; if the balanced adjustment is already performed, the number of allocated code words of the cell comprises the number of code words that is adjusted last time.

18. The apparatus of claim 17, wherein the resource allocating and adjusting unit comprises:
a first judging module configured to compare the ratio of consumed power of the cell with the ratio of consumed code words of the cell; and
a first resource adjusting module configured to adjust resources;
if the first judging module determines that the ratio of consumed power of the cell is different from the ratio of consumed code words of the cell, increase a resource with a smaller consumption ratio or reduce a resource with a larger consumption ratio until a relationship between the ratio of consumed power of the cell and the ratio of consumed code words of the cell complies with a preset first rule, and select power and the number of code words that comply with a preset second rule as the allocated power and number of code words.

19. The apparatus of claim 17, wherein the resource allocating and adjusting unit comprises:
a fourth judging module configured to compare a currently obtained TBS with the data traffic to be transmitted in the buffer, and compare the ratio of consumed power of the cell with the ratio of consumed code words of the cell; and
a fourth resource adjusting module configured to adjust resources; and if the fourth judging module determines that the ratio of consumed power of the cell is different from the ratio of consumed code words of the cell, reduce a resource with a larger consumption ratio and maintains a resource with a smaller consumption ratio; if the fourth judging module determines that an obtained TBS is greater than the data traffic to be transmitted in the buffer, the fourth resource adjusting module configured to reduce a resource corresponding to a larger one of a ratio of consumed power of the cell and a ratio of consumed code words of the cell that are obtained by current calculation until a TBS suitable for the data traffic to be transmitted in the buffer is found.

20. The apparatus of claim 16, wherein the resource utilization in the data transmission physical channels of the cell comprises a ratio of remaining power of the cell and a ratio of remaining code words of the cell, wherein:
the ratio of remaining power of the cell is a ratio of unallocated power of the cell within the current TTI to originally available maximum power of the cell within the current TTI, wherein the originally available maximum power of the cell comprises allocated power of the cell and unallocated power of the cell within the current TTI; if the balance adjustment is not performed, the unallocated power of the cell does not comprise the initial power; if the balance adjustment is already performed, the unallocated power of the cell does not comprise power that is adjusted last time; and
the ratio of remaining code words of the cell is a ratio of unallocated code words of the cell within the TTI to the originally available maximum number of code words of the cell within the current TTI, wherein the originally available maximum number of code words of the cell comprises the number of allocated code words of the cell and the number of unallocated code words of the cell within the current TTI; if the balance adjustment is not performed, the number of unallocated code words of the cell does not comprise the initial number of code words; if the balance adjustment is already performed, the number of unallocated code words of the cell does not comprise the number of code words that is adjusted last time.

21. The apparatus of claim 20, wherein the resource allocating and adjusting unit comprises:
a second judging module configured to compare the ratio of remaining power of the cell with the ratio of remaining code words of the cell; and
a second resource adjusting module configured to: adjust resources;
if the second judging module determines that the ratio of remaining power of the cell is different from the ratio of remaining code words of the cell, reduce a resource with a smaller remainder ratio until the second judging module determines that the relationship between the ratio of remaining power of the cell and the ratio of remaining code words of the cell complies with a preset third rule, and select power and the number of code words that comply with a preset fourth rule as the allocated power and number of code words.

22. The apparatus of claim 20, wherein the resource allocating and adjusting unit comprises:
a fifth judging module configured to compare a currently obtained TBS with the data traffic to be transmitted in the buffer, and compare the ratio of consumed power of the cell with the ratio of consumed code words of the cell; and
a fifth resource adjusting module, configured to adjust resources;

if the fifth judging module determines that the ratio of remaining power of the cell is different from the ratio of remaining code words of the cell, the fifth resource adjusting module configured to reduce a resource with a smaller remainder ratio and maintain a resource with a larger remainder ratio; if the fifth judging module determines that an obtained TBS is greater than the data traffic to be transmitted in the buffer, the fifth resource adjusting module configured to reduce a resource corresponding to a smaller one of a ratio of remaining power of the cell and a ratio of remaining code words of the cell that are obtained by current calculation until a TBS suitable for the data traffic to be transmitted in the buffer is found.

23. The apparatus of claim 15, wherein the resource allocating and adjusting unit adjusts the power by adjusting a channel quality indicator (CQI) and the resource utilization in the data transmission physical channels comprises the maximum number of times that the CQI is allowed to reduce continuously and the maximum number of times that the number of code words is allowed to reduce continuously.

24. The apparatus of claim 23, wherein the resource allocating and adjusting unit comprises:
   a third judging module configured to compare a currently obtained TBS with data traffic to be transmitted in a buffer, compare the number of times that the CQI is reduced with the maximum number of times that the CQI is allowed to reduce continuously or compare the number of times that the number of code words are reduced with the maximum number of times the number of code words is allowed to reduce continuously; and
   a third resource adjusting module configured to adjust resources;

if the third judging module determines that a TBS corresponding to currently available maximum power and the currently available maximum number of code words is greater than the data traffic to be transmitted in the buffer, the third resource adjusting module is configured to reduce a resource corresponding to a larger one of the maximum number of times the CQI is allowed to reduce continuously and the maximum number of times the number of code words is allowed to reduce continuously;

if the third judging module determines that an obtained TBS is still greater than the data traffic to be transmitted in the buffer, the third resource adjusting module configured to reduce the resource continuously until the number of times the resource is continuously reduced reaches the maximum number of times the resource is allowed to reduce continuously; and if the obtained TBS is still greater than the data traffic to be transmitted, reduce another resource; and if the third judging module determines that an obtained TBS is still greater than the data traffic to be transmitted in the buffer, reduce the other resource continuously until the maximum number of times the other resource is continuously reduced reaches the maximum number of times the other resource is allowed to reduce continuously; and if an obtained TBS is still greater than the data traffic to be transmitted in the buffer, reduce the first resource until a TBS suitable for the data traffic to be transmitted in the buffer is found.

* * * * *